United States Patent [19]

Ogiso

[11] 3,711,756

[45] Jan. 16, 1973

[54] PROGRAMMING SYSTEM

[75] Inventor: Mithutoshi Ogiso, Kawasaki, Japan

[73] Assignee: Canon Kabushiki Kaisha, Tokyo, Japan

[22] Filed: June 10, 1970

[21] Appl. No.: 45,136

[30] Foreign Application Priority Data

June 12, 1969 Japan ................................44/46596

[52] U.S. Cl.................318/162, 340/167 A, 340/162

[51] Int. Cl............................................G05b 19/42

[58] Field of Search.............318/568, 162, 163, 164; 340/167 A, 206, 162

[56] References Cited

UNITED STATES PATENTS

| | | | |
|---|---|---|---|
| 3,356,918 | 12/1967 | Williams | 318/162 X |
| 3,241,020 | 3/1966 | Milenkovic | 318/568 |
| 3,230,516 | 1/1966 | Neergaard | 318/568 X |
| 3,178,716 | 4/1965 | Slatin | 318/568 X |

*Primary Examiner*—Benjamin Dobeck
*Attorney*—McGlew and Toren

[57] ABSTRACT

A programming system for providing play-back from a number of reproduction media in accordance with a preset program, characterized in that pulses of different time intervals are prepared in a corresponding relationship with respective reproduction media and are recorded on a program recording material in sequence determined by a desired program.

8 Claims, 8 Drawing Figures

INVENTOR
MITHUTOSHI OGISO
BY McGlew & Toren
ATTORNEY

INVENTOR

MITHUTOSHI OGISO

BY McGlew & Toren

ATTORNEY

INVENTOR.
MITHUTOCHI OGISO
BY *Mc Glew & Toren*
ATTORNEYS

INVENTOR.

MITHUTOSHI OGISO

BY McGlew & Toren

ATTORNEYS

PROGRAMMING SYSTEM

The present invention relates to a programming system selectively driving system for providing play-back from a number of reproduction media in accordance with a preset program, particularly, for use in a magnetic tape unit including a plurality of regeneration madia (hereinafter referred to as a record), such as a plurality of cassettes each containing an endless tape having several tracks, and in which desired pieces of music (or any other contents) are previously recorded in arbitrarily selected cassettes and tracks in a desired sequence and later automatically played back in the order of the sequence.

The present invention is also applicable to other systems than the above-mentioned cassette system, such as a so-called reel-to-reel cartridge system in which a tape is driven between a pair of reels, an open reel system in which a plurality of tape decks are selectively operated, or variations of these magnetic units employing magnetic wires rather than tapes. The signals recorded in or on these media may be sound signals as well as video signals. Further, the invention is also applicable to juke boxes which use record discs or to projection purposes where a great number of slides contained in a magazine are to be projected in the order of a desired program.

The main features of the programming system according to the present invention are that pulses of different time intervals are prepared in a corresponding relation-ship with a respective reproduction media and are recorded on a program recording material in sequence determined by a desired program, particularly by the provision of a pulse generator in a program signal sending circuit which is operative to set a selected one from a number of reproduction media in play-back position and that the generator produces pulses having deferent time intervals with addition of certain constant time interval to make it easy to set the selection and reset the system. The features of the selecting system according to the present invention are that a selecting scanner moves towards the media to be selected and stops at the media, and after the selection, the selecting scanner remains at the position to save time required for the selection.

The present invention will be described in detail referring to the attached drawings in which.

Figure 1:
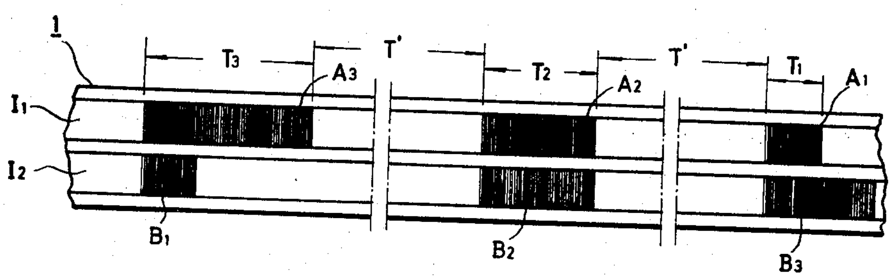
FIG. 1 is a schematic front view, in an enlarged scale, of a programmed material prepared in accordance with the programming system of the present invention.

In FIG. 1, 1 is a magnetic record, 1 — 1 and 1 - 2 are respectively a track for the tape 1. $A_1$, $A_2$ and $A_3$ are program signals respectively of different time intervals, $T_1$, $T_2$ and $T_3$ corresponding to respective reproduction media, and $T'$ is a pause time.

FIG. 2 to FIG. 5 show an example in which five records are involved, and $T_2$ is set to be $nT_1$.

Figure 2:
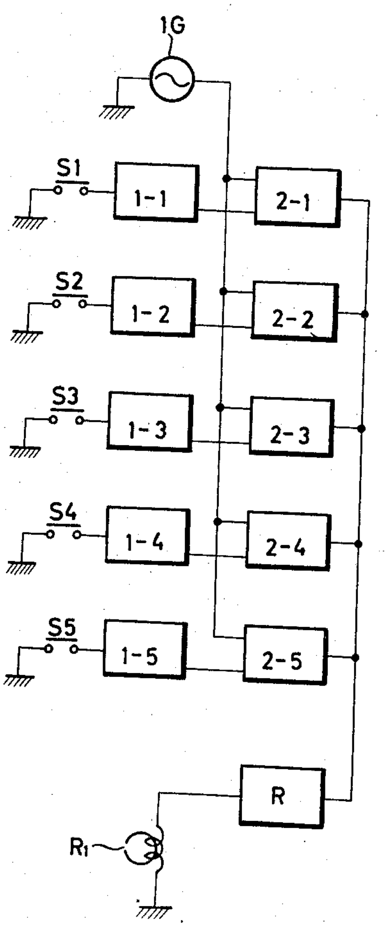
FIG. 2 is a schematic block diagram of a recorder circuit used for preparing a program in accordance with the programming system of the invention.
Figure 3:
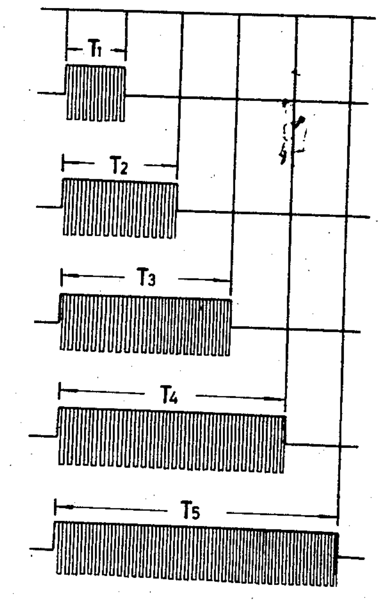
FIG. 3 shows the waveforms of the recorded signals or program signals.

In FIG. 2 the denotation 1 G represents a pulse generator. The pulse generator G generates a pulse of 1 KHZ for example. $S_1$ to $S_5$ are switches associated with each of a number records, not shown, 1 — 1 to 1 - 5 are monostable multivibrator circuits which produce pulses having different time intervals $T_1$ to $T_5$ as shown in FIG. 1 and FIG. 3 for the respective records, 2 - 1 to 2 - 5 are AND gate circuits, R is a recording circuit, and $R_1$ is a recording head.

Figure 4:
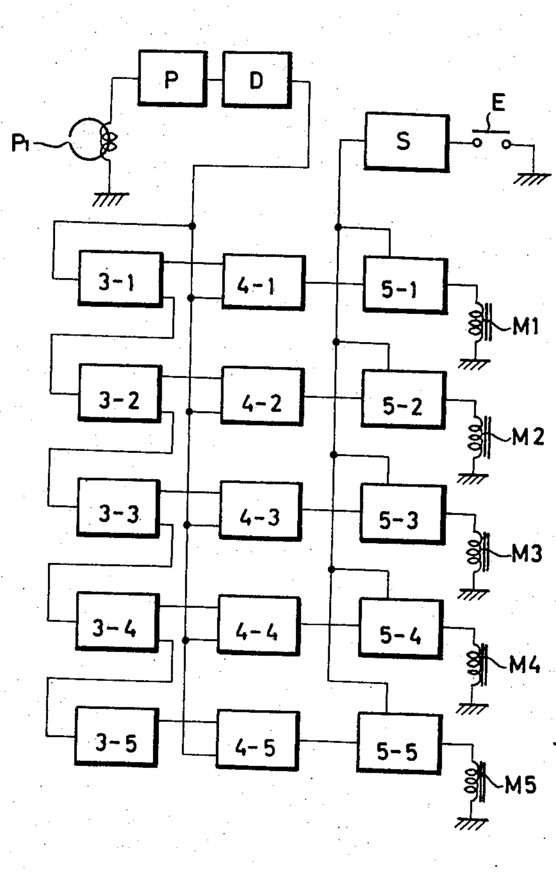
FIG. 4 is a schematic block diagram of a play-back circuit for obtaining the program signal from a programmed tape.
Figure 5:
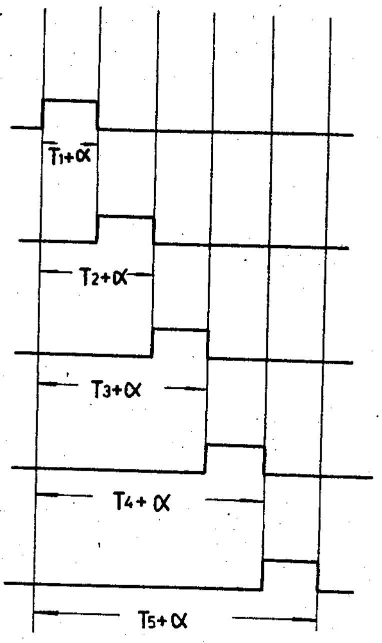
FIG. 5 shows the waveform of control pulses for the play-back circuit.

In FIG. 4, the denotation $P_1$ represents a play-back head (which may be used also as a recording head $R_1$), P is a play-back circuit, D is a circuit which differentiates output from the play-back circuit P after smoothing or integrating, 3 - 1 to 3 - 5 are monostable multivibrator circuits which produce pulses having time intervals $T_1$ $\alpha$ to $T_5 + \alpha$ with addition of a certain constant time interval of the respective programmed signals corresponding to each record plus $a$, defined by an inequality $0<a<T_1$. The denotations 4 - 1 to 4 - 5 represent AND gate circuits, 5 - 1 to 5 - 5 are output circuits, M - 1 to M - 5 are electro-magnets for relays or plungers operative to set a selected cassette in the play-back condition, and S is a resetting circuit which resets the output circuits 5 - 1 to 5 - 5 upon closure of an end switch E as by an end mark on a record, such as a silver tab placed on a recorded tape at the end thereof.

The method to arrange a program and to play-back according to the prepared program will be described in detail below with reference to the example shown.

Assuming that a third record is to be programmed, the third switch $S_3$ is pushed to operate the monostable multivibrator 1 - 3, which applies a pulse having a time interval (pulse width) of $T_3$ to the AND gate 2 - 3. Because the signal from the generator G is present at the gate 2 - 3 at this moment, the signal is passed to the recording circuit R to cause the recording head $R_1$ to record on the tape 1 a program signal $A_3$ of time interval $T_3$ corresponding to the third record, as shown in FIG. 1. It is necessary to feed the tape 1 at a constant speed during the time interval $T_3$. It will be appreciated here that there is a need for a delay unit which operates the monostable multivibrator 1 - 3 after the switch $S_3$ has been pushed to drive the tape 1 and the latter has reached a constant speed, and for a device which feeds the tape so as to establish a pause time $T'$ slightly longer than the maximum time interval $T_5$ of the program signal every time a switch $S_1$ to $S_5$ is pushed.

If the second record is to be programmed next, the switch $S_2$ is pushed, whereby the monostable multivibrator 1 - 2 produces a pulse of pulse width $T_2$, thereby causing a program signal $A_2$ of time interval $T_2$ corresponding to the second record to be recorded on the tape 1. Subsequently the similar procedure is repeated by pushing the switches $S_1$ to $S_5$ in the sequence desired for play-back to record the program signals on the tape 1 until desired programming is finished. Tape tracks $1_1$ and $1_2$ of the program tape can be used for cassette signals and channel signals, respectively.

The play-back of the programmed tape 1 in accordance with the program will now be described. When a play-back start button, not shown, is pushed, the tape 1 is once driven in a reverse direction to arrange the program, to return to its original position, and then driven in the forward direction. When the program signal $A_3$ is reproduced by the play-back head $P_1$ as the tape 1 advances, the leading edge of the reproduced signal drives the monostable multivibrator circuit 3 – 1 shown in FIG. 4. The resulting output pulse of the circuit 3 – 1 has a pulse width of $T_1 + \alpha$ as mentioned before, and is applied to the AND gate circuit 4 – 1. However, because of the time relationship of $T_3 > T_1 + \alpha$, which prevents the AND gate circuit 4 – 1 from detecting the trailing edge of the program signal $A_3$ at the play-back head $P_1$, there is no output from the AND gate circuit 4 – 1.

On the other hand, while the trailing edge of the output pulse from the monostable multivibrator circuit 3 – 1 drives the monostable multivibrator circuit 3 – 2 in the next stage, again there is no output from the AND gate circuit 4 – 2 because of the relationship $T_3 > T_2 + \alpha$. Then, when the trailing edge of the output pulse from the circuit 3 – 2 drives the monostable multivibrator circuit 3 — 3, the trailing edge of the program signal $A_3$ is detected because of $T_3 < T_3 + \alpha$, and the detected signal is input to the AND gate circuit 4 – 3 to open this gate circuit. The output signal therefrom drives the output circuit 5 – 3, thereby causing the relay or the electro-magnet $M_3$ to select the third record corresponding to the program $A_3$ and setting that record in the play-back position or condition. The setting mechanism is suitably designed to meet the play-back device used.

When the play-back of the third record is completed and the end switch E is closed by the associated end mark of the reproduction media, the resetting circuit becomes operative to issue a reset pulse which restores the output circuit 5 – 3 to its original state, thereby terminating the play-back condition.

The above-mentioned reset pulse also serves to feed the programmed tape 1, reproducing the next program signal $A_2$ and operating the circuits 3 – 2, 4 – 2 and 5 – 2 to play-back the second record. Subsequently, the above operation is repeated to provide an automatic play-back according to the program. The output circuits 5 – 1 to 5 — 5 shown may comprise bistable multivibrators, thyristors or the like.

When playing back selectively from a number of cassettes each containing an endless tape having a plurality of recording tracks, contents are previously and arbitrarily accorded with cassette and track numbers. A pair of the program arranging recorder circuits shown in FIG. 2 are provided for use with the cassette number and track number, and program signals $A_1$ to $A_3$ prepared in the track $1_1$ of the magnetic tape 1 are for cassette number and the program signals $B_1$ to $B_3$ in the track $1_2$ of the magnetic tape 1 are for track number respectively. When this tape 1 is played back by the program signal detector circuit as shown in FIG. 4 to provide any selective play-back in accord with the program, a matrix circuit may be used, for example, in order to select a single content by logical operation of two reproduced program signals, representing the cassette and track numbers. Since a known matrix circuit can be used at this end, it will not be described here.

In view of the arrangement mentioned above, the invention provides the effect that arrangement of a desired program among a number of records and play-back in accordance with such program by reproduction and reliable detection of program signals is effected by an extremely simple operation. Next explanation will be made on the selecting system according to the present invention applicable to the above-mentioned programming system.

Figure 6:
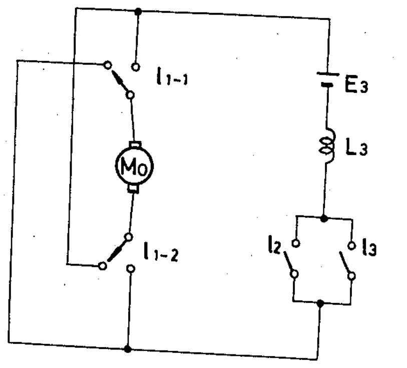
FIG. 6 shows a principle of the selecting system according to the present invention.

In FIG. 6 switches $L_{1-1}$ and $L_{1-2}$ are connected in series with a battery $E_3$ and a coil $L_3$ and parallel circuits of switches $L_2$ and $L_3$ to drive a motor $M_o$. Associated change-over of the switches $L_{1-1}$ and $L_{1-2}$ causes the motor $M_o$ to rotate in either direction to save time required for selection. For the change-over a control circuit as shown in FIG. 7 is used.

Figure 7:
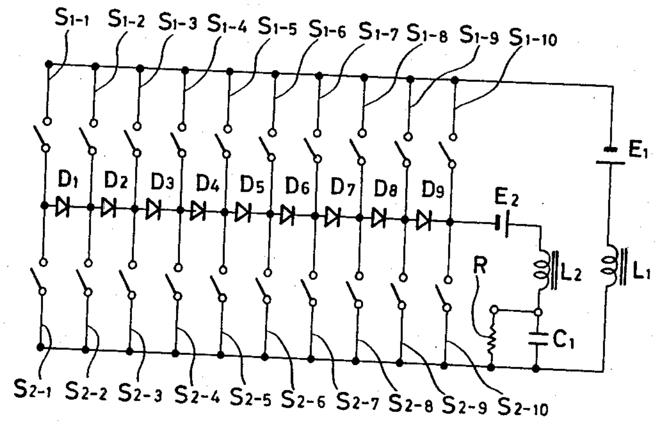
FIG. 7 is a circuit diagram used for the inventive selecting system.

In FIG. 7 $S_{1-1} - S_{1-10}$ are switches and $S_{2-1} - S_{2-10}$ are switches operative in association with the scanning selector. The switches $S_{1-1} - S_{1-10}$ and the switches $S_{2-1}$ to $S_{2-10}$ are connected in series respectively with a common coil $L_1$ and a common power $E_1$. Between connecting points of the respective switches $S_{1-n}$ and $S_{2-n}$ and $S_1 - n + 1$ and $S_2 - n + 1$ are provided a diode D*n*. Diodes $D_1 - D_9$ are connected in series with a battery $E_2$, a coil $L_2$ and a parallel circuit of a capacitor $C_1$ and a resistor R for discharge through the switch $S_{2-1}$.

The example shown in FIG. 8 will be described in detail in reference to FIG. 6 and FIG. 7.

C is a magazine for containing with an equal space slides $F_1$ to $F_{10}$ mounting a positive film, and the magazine 1 is permitted to move in either direction A or B. The slides may be substituted with cartridges containing cine-films.

2 is a rack for moving the magazine 1, in engagement with a notch 3 of the projection formed at the upper side of the magazine 1. 4 is a driving gear coupled with a shaft of a magazine driving motor M, engaging with the rack 2. A switch actuator 5 is fixed to the lower portion of the projection engaging the notch 3 and moves in either direction A or B in response to the movement of the rack 2. The switch actuator 5 is of non-conductive material and L shape, at one end of which is fixed a metal movable contact 6. The movable contact 6 and fixed contacts $8_1 - 8_{10}$ provided in position corresponding to the respective position of the slides $F_1$ to $F_{10}$ constitute the above change-over switches $S_{1-1}$ to $S_{1-10}$. 7 is a hole frame fixed to a projector for taking out and putting in the slides, provided on a side of the magazine C. A slide changing mechanism (not shown) is provided on the opposite side for pushing off only the slide 5. After the slide is pushed out the slide is projected through an optical system not shown with aid of a light source not shown. The width along the moving direction A or B of the notch 3 of the projection of the magazine O is enough for changing the movable contact 6 of the switch actuator 5 to the next fixed contact when the projection of the rack 2 engages with and moves in the notch 3. The position of the movable contact 6 is located on the fixed contact corresponding to the slide focing with the hole of the hole from 7 in case the projection of the rack 2 engages with the notch 3 of the magazine C at the position shown in FIG. 8 after the movement of the rack 2 in the direction A.

Figure 8:
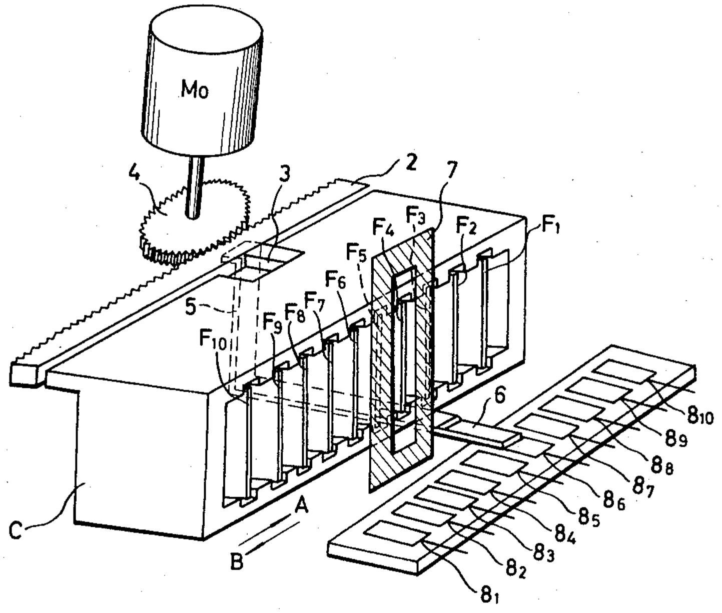
FIG. 8 is an example of the inventive selecting system applied to a slide or cartridge cine-projector.

In FIG. 8 the magazine C is positioned at a position in which the slide $F_5$ is ready to be taken out through the hole of the hole frame 7. In order to project the slide $F_8$ at this condition, a selector botton for the slide $F_8$ closes the selector switch $S_{2-8}$. Although the scanner switch $S_{1-5}$ is closed at this time, the current does not flow and the coil $L_1$ is not actuated because the diodes in the closed circuit $E_1 - L_1 - S_{2-8} - D_7 - D_6 - D_5 - S_{1-5} - E_1$ cuts off the current. While the circuit $E_2 - L_2 - C_1 - S_{2-8} - D_8 - D_9 - E_2$ is closed when the switch $S_{2-8}$ is closed so that the current flows to charge the capacitor $C_1$ through the coil $L_2$ to actuate the coil $L_2$. As the switch $l_2$ is closed in association with the energization of the coil $L_2$, the circuit $E_3 - l_{1-2} - M_1 - l_{1-1} - l_2 - L_3 - F_3$ is closed to drive the motor $M_o$ as well as to actuate the coil $L_3$ to self hold the switch with the switch $l_3$ to continue the rotation of the motor $M_o$.

The rack 2 moves in the direction A, driven by the motor $M_o$, and the magazine C moves in the direction A correspondingly. The movable contact 6 also moves in the direction A to open the switch $S_{1-5}$ to close the switch $S_{1-6}$, $S_{1-7}$ and $S_{1-8}$ in the order. When the switch $S_{1-8}$ is closed the circuit $E_1 - L_1 - S_{2-8} - S_{1-8} - E_1$ actuates the coil $L_1$ to change over the switches $l_{1-1}$ and $l_{1-2}$.

At the moment of the change-over of the switches $l_{1-1}$ and $l_{1-2}$, the supplied power to the motor $M_o$ and the coil $L_3$ is interrupted to open the self held switch $l_3$.

The relay switch $l_2$ associated with the coil $L_2$ becomes opened when the charge across the capacitor $C_1$ is full filled to deenergize the coil $L_2$. The switches $l_{1-1}$ and $l_{1-2}$ are changed over but the motor $M_o$ does not continue to rotate. As the motor $M_o$ stops at a position where the movable contact 6 contacts with a fixed contact $S_{1-8}$, the slide $F_8$ becomes ready for projection. Therefore, by actuating the slide pushing off mechanism in association with the stoppage of the motor $M_o$. Only the slide $F_8$ is selectively taken out for the projection through the hole of the hole frame 7.

In order to bring the slide $F_2$ to a projection position, the selector button is pushed to close the switch $S_{2-2}$. In this case the charge across the capacitor $C_1$ has been discharged through the resistor R before the switch $S_{2-2}$ is closed.

When the switch $S_{2-2}$ is closed, the switches $l_{1-1}$ and $l_{1-2}$ are changed over and the switch $l_2$ is closed so that the motor $M_o$ starts to rotate in a reverse direction to move the projection of the rack 2 within the notch 3 of the magazine C and the projection contacts with the opposite side of the notch 3. During this movement, the magazine C does not move, but the switch $S_{1-7}$ is closed as the movable contact 6 moves in the direction B. The motor $M_o$ continues to rotate further and the magazine is moved in the direction B, with the movement of the magazine C the contacts $S_{1-8}$ to $S_{1-2}$ are closed in the order and when the movable contact 6 arrives at the fixed contact 8, that is when the switch $S_{1-1}$ is closed, the coil $L_1$ is deenergized through the diode $D_1$, thus changing the switches $l_{1-1}$ and $l_{1-2}$. At the time of the change-over of the switch $l_{1-1}$ and $l_{1-2}$, the switches are opened instantaneously so that the self-held contact $l_3$ associated with the coil $L_3$ is also opened. The coil $l_2$ is energized only when the capacitor $C_1$ is charged to open the switch $l_2$ and thus the motor $M_1$ stops its rotation.

The movable members and the fixed members for the selection may be interchanged.

This selecting system saves the time required for selection of reproduction media with a very simple controller circuit. The selecting system described above may be used not only for projectors but also for audio equipments or the like, and is quite convenient, particularly for being incorporated in programming system according to the present invention as is easily understood. The apparatus works automatically with much saving of required time and works accurately in accordance with the recorded program.

For combination of the programming system and the selecting system it is necessary that the electromagnets $M_1$ to $M_5$ in FIG. 4 close the switches $S_{1-1}$ to $S_{1-10}$ in FIG. 8 in accordance with the recorded program.

What is claimed is:

1. A programming system for selecting and utilizing individual ones of a number of information bearing media in a given sequence, comprising a recording having recorded thereon a plurality of pulses each of which has a pulse width representative of one of the media to be selected, said pulses being recorded in a sequence corresponding to the given sequence, playback means responsive to said recording for producing from said recording a sequence of pulse signals corresponding to the sequence at which the pulses are recorded thereon, detection means coupled to said playback means and having a plurality of interconnected detection circuits each responsive to a pulse signal of a different pulse width and producing a separate output signal, and control means responsive to the separate ones of the output signals and coupled to the media for moving and utilizing the selected ones of the media in a given sequence on the basis of the output signals, a first of said detection means including a first pulse generating circuit responsive to the leading edge of each pulse width for producing a first pulse having a pulse width greater than the width of the shortest pulse representing the medium on said record but narrower than the second shortest pulse representing a medium on said record, a second of said detection circuits including a second generating circuit responsive to the trailing edge of said first pulse generating circuit for producing a pulse substantially equal to the pulse width of the second shortest pulse width representing the medium, a third of said detection circuits including a third generating circuit responsive to the trailing edge of said first pulse generating circuit for producing a pulse whose width is substantially equal to the pulse width of the third shortest pulse width representing the medium on the record, said second detection circuit being connected to said first detection circuit and said third detection circuit being connected to said second detection circuit, and three AND gate means each responsive to said playback means and one of said generating circuits for producing the output signal.

2. A programming system as in claim 1, wherein said control means include three bistable multivibrators each coupled to one of said AND gate means to receive the output signal therefrom so as to flip in one direction in response to an output signal therefrom, signal means responsive to the termination of operation of one of said information bearing media, each of said bistable multivibrators having an input connected to said signal means for flipping said bistable multivibrator in its other direction in response to said signal means.

3. A system as in claim 1 wherein said first and second pulse generator circuits are monostable multivibrators.

4. A system as in claim 2 wherein said control means include first, second and third switching means respectively connected with one of said multivibrators, said switching means being switched on and off by the outputs of said multivibrators, rectifying means connecting said switching means parallel to each other, fourth, fifth and sixth switching means respectively connected in series with said first, second and third switching means, said fourth, fifth and sixth switching means being switched on in response to the position of a corresponding reproduction medium, motor means, first motor operating means to make said motor means run forward, said first motor operating means being connected in series with said rectifying means but parallel to said first, second and third switching means, second motor operating means for making said motor means run backwards, said second motor operating means being connected in series with said first, second and third switching means, but parallel to said fourth, fifth and sixth switching means, selection scanning means for selecting the desired reproduction medium by scanning the reproduction media, said selection scanning means being driven by said motor means and operative to set and reset said switching means.

5. A system as in claim 4, wherein said fourth, fifth and sixth switching means are switched on in sequence by said scanning means as said motor means moves said scanning means.

6. A system as in claim 5, wherein said scanning means move with said motor means, media containing means coupled to said motor means so as to be moved by said motor means only after said scanning means has moved from one of said switching means to the other of said switching means when the motor changes direction, whereby after said scanning means reaches a selected position said fourth, fifth and sixth switching means act with said first, second and third switching means to cause said first and second motor operating means to stop said motor means.

7. An automatic playback apparatus for selecting and reproducing individual ones of a number of information bearing media in a given sequence, comprising a plurality of information bearing media to be played back, a programming tape having recorded thereon a plurality of pulses each of which has a pulse width representative of one of the media to be selected, said pulses being recorded in a sequence corresponding to the given sequence, playback means responsive to said tape for producing from said tape a sequence of pulse signals corresponding to the sequence at which the pulses are recorded thereon, detection means coupled to said playback means and having a plurality of interconnected detection circuits each responsive to a pulse signal of a different pulse width and producing a separate output signal, and control means responsive to the separate ones of said output signals and coupled to the media for moving and playing back the selected ones of the media in a given sequence on the basis of the output signals.

8. An automatic playback system for operating information bearing media in a given sequence, comprising a record having recorded thereon a plurality of pulses each of which has a pulse width representative of one of the media to be reproduced, said pulses being recorded in a sequence corresponding to the given sequence, detecting means operative with said recording to produce pulse signals corresponding in width to the width of the pulses recorded on said recording, said detecting means having feeding means for moving said recording at a predetermined speed, and control means responsive to the widths of the signal and coupled to the media for selecting and playing back individual ones of the media in the given sequence determined by the widths of the pulses.

* * * * *